United States Patent [19]

Jakubowski et al.

[11] Patent Number: 5,029,776
[45] Date of Patent: Jul. 9, 1991

[54] VARIABLE EXPLOSIVE SOURCE FOR AN EJECTOR SYSTEM

[75] Inventors: Ted M. Jakubowski, Long Beach; Joseph Atofau, Buena Park, both of Calif.

[73] Assignee: McDonnell Douglas Corporation, Long Beach, Calif.

[21] Appl. No.: 487,922

[22] Filed: Mar. 5, 1990

[51] Int. Cl.$^5$ ............................................. B64D 1/02
[52] U.S. Cl. .................................. 244/137.4; 89/1.54; 89/1.14; 60/634
[58] Field of Search ......... 244/137.4, 122 A, 122 AC, 244/122 AB; 89/1.54, 1.57, 1.14; 60/632, 634, 533, 415

[56] References Cited

U.S. PATENT DOCUMENTS

| | | | |
|---|---|---|---|
| 3,557,550 | 1/1971 | Legarra | 244/137.4 |
| 4,043,525 | 8/1977 | Jakubowski, Jr. | 244/137.4 |
| 4,050,656 | 9/1977 | Peterson | 244/137.4 |
| 4,246,477 | 1/1981 | Sun et al. | 244/137.4 |
| 4,388,853 | 6/1983 | Griffin et al. | 89/1.57 |
| 4,412,419 | 11/1983 | Thomas et al. | 60/634 |
| 4,706,909 | 11/1987 | Cuevas et al. | 244/122 AC |
| 4,721,273 | 1/1988 | Trikha | 244/122 AE |
| 4,749,154 | 6/1988 | Herndon et al. | 244/122 AB |

Primary Examiner—Galen Barefoot
Attorney, Agent, or Firm—Donald E. Stout; Gregory A. Cone; John P. Scholl

[57] ABSTRACT

An explosive source for a store ejector system, having a plurality of explosive cartridges that are sequentially detonated to provide a relatively constant force on the store, when the store is ejected. Operatively connected to each explosive cartridge, is a check valve that prevents a detonated cartridge from simultaneously self-detonating the other cartridges that have not been detonated.

7 Claims, 2 Drawing Sheets

VARIABLE EXPLOSIVE SOURCE FOR AN EJECTOR SYSTEM

BACKGROUND OF INVENTION

This invention relates to explosive sources for ejector systems, that forcefully release stores (bombs) from an aircraft.

In typical ejector systems the store is restrained by a pair of latches that hook into lugs attached to the store. The latches are operatively connected to an over-center release mechanism that is actuated when an explosive cartridge is detonated. The cartridge provides a pressurized gas to an unlocking piston which in turn moves the over-center linkage and releases the latches from the store. At the same time, the pressurized gas is manifolded into two ejection piston cylinders, wherein the pistons extend and forcefully eject the store from the aircraft. This type of system is disclosed in U.S. Pat. No. 4,050,656 by PETERSON, see also U.S. Pat. No. 4,347,777 by JAKUBOWSKI, et al, on over-center release mechanisms.

It is important that the ejector pistons thrust the store through the airstream envelope of the aircraft. Failure to extend the store beyond the airstream envelope could cause the store to deviate from its intended target, or to ride in the airstream and damage the aircraft. To insure store detachment, a set of design criteria have been established wherein the store must obtain a predetermined velocity when it is released from the ejector piston. For example, certain older aircraft required that a 500 lb. store be released at a velocity of 12 ft/sec. As aircraft become faster the velocity requirement becomes higher, with even higher velocities needed for bombers, where the store must exit from the fuselage of the aircraft.

At present, explosive cartridges come in standard units wherein each size of cartridge provides a predetermined amount of energy. To obtain a desired store velocity a corresponding number of cartridges are used in the system. Generally speaking, store velocity can be increased by adding cartridges to the system. The simultaneous detonation of the cartridges providing enough energy to eject the store at the required velocity. As the number of cartridges are increased, the force and corresponding shock exerted on the store also increases. Because modern stores, particularly guided bombs, have a large amount of electronics, the stores are sensitive to shock. It is therefore desirable to have an high energy ejector system that provides a smooth continuous force to the store.

One type of system that addresses this problem is disclosed in U.S. Pat. No. 4,850,553 by TAKATA, et al. The Takata system has a pair of telescoping pistons that provides a stepped reduction of piston area as the piston is extended, causing an increase in piston force. This system produces a more continuous piston force, but still has the initial shock spike caused by the simultaneous detonation of the explosive cartridges. In addition, the pistons lock upon extension, requiring the rack to be manually reset, a time consuming function. Therefore what is needed is an ejector system that provides a continuous ejector force, using standard explosive cartridge and telescoping ejector piston components.

SUMMARY OF INVENTION

This invention is an explosive source for a standard ejector system, that provides a relatively constant ejection force by sequentially detonating a plurality of standard explosive cartridges. The cartridges produce a high pressure gas when detonated. The gas is then directed to a pair of ejector pistons by a manifold. In operation, a first cartridge is detonated, initiating movement of the ejector pistons. After a predetermined time interval a second cartridge is detonated supplying additional energy to the system, with this sequence continuing until a predetermined amount of energy is provided to the ejector pistons. By providing a sequential input of energy, the large shocks typically found in standard simultaneously detonated cartridge systems is avoided.

To prevent the heat and pressure of an exploded cartridge from simultaneously self-detonating the other cartridges, a series of check valves are operatively connected to each cartridge. The check valves prevent gaseous communication between each cartridge. The valves open when the corresponding cartridge is detonated. This insures that the cartridges will detonate sequentially and not simultaneously.

The cartridge may be operatively connected to a computer controller wherein the computer controller provides input to the cartridge detonators. This would allow the timing and number of cartridges exploded to be varied while the aircraft is in flight, allowing the ejector system to compensate for variations in aircraft attack angles, speed etc.. The flexibility of the computer controller would also allow stores of different type and weight to be attached to the system, without having to manually readjust the system, as is normally done in present bomb racks.

Therefore it is an object of this invention to provide an ejector system that produces an essentially constant force vs time curve for a store ejected from the system.

It is also an object of this invention to provide an ejector system that is capable of changing shock loads and release velocities, without manual readjustment of the ejector system.

It is also an object of this invention to provide an ejector system, wherein the shock loads and release velocity of the store can be changed from a remote location of the aircraft.

It is also an object of this invention to provide an ejector system that produces an essentially constant force vs time curve for a store ejected from the system, using standard cartridge and ejector piston components.

The objectives and advantages of this invention will become more apparent to those skilled in the art after further review of the specification and the drawings. However, it is to be understood that the drawings are for purposes of illustration and description only, and are not intended as a definition of the limits of the invention.

DETAILED DESCRIPTION OF THE INVENTION

Figure 1:
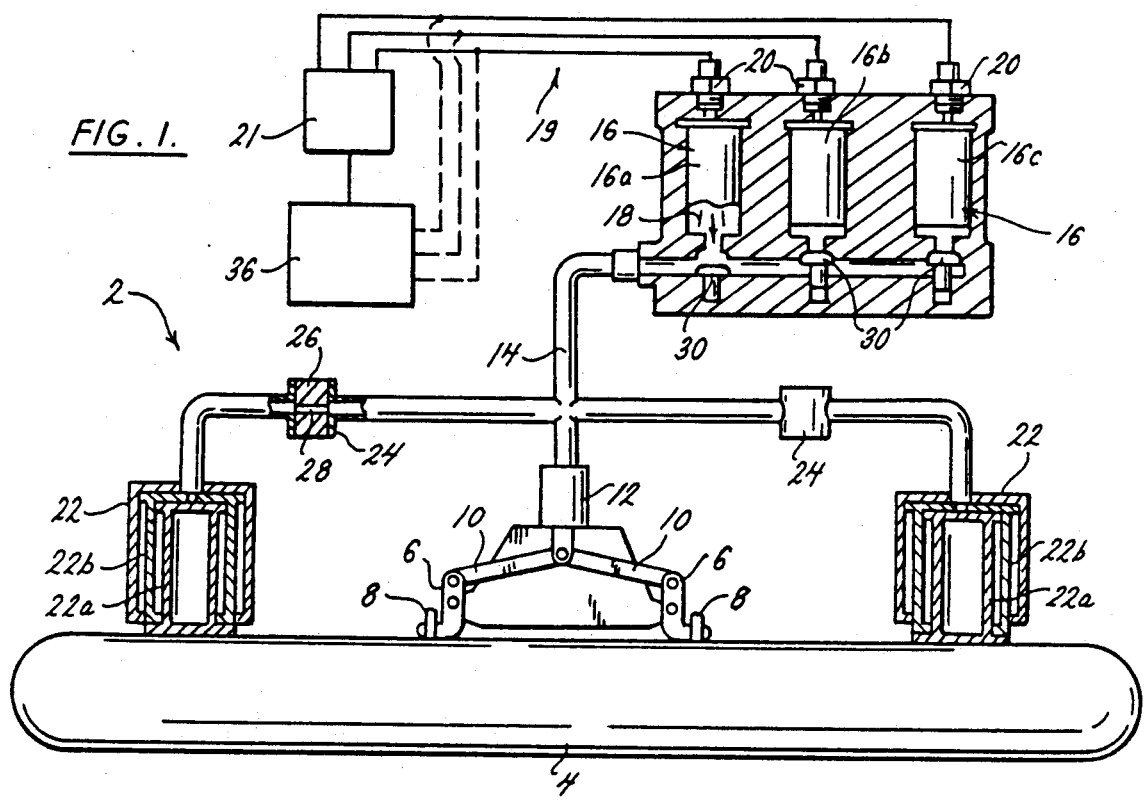
FIG. 1 is a diagrammatical view of a store restrained by an ejector system showing the interrelationship between a computer controller, cartridges, over-center latch mechanism and ejector pistons.

Referring to the drawings more particularly by reference numbers, number 2 in FIG. 1 is an ejector system 2. The system 2 restrains and ejects a store 4 from an aircraft. The store 4 may be a bomb or missile, with the system 2 and store 4 being attached to any part of the plane, whether it be under the wing or in the bomb bay.

The store 4 is restrained by a pair of latches 6 that fit into a pair of lugs 8 attached to the store 4. The latches 6 are connected to an over-center latch mechanism 10 which is attached to a release piston 12, schematically shown in FIG. 1. The over-center latch mechanism 10 can be any standard ejector rack restraint assembly including the systems disclosed in U.S. Pat. No. 4,050,656 by PETERSON and U.S. Pat. No. 4,347,777 by JAKUBOWSKI et al, which are hereby incorporated by reference.

The release piston 12 is connected by manifold means 14, to one or more explosive cartridges 16 to allow gaseous communication between the cartridges 16 and the piston 12. FIG. 1 shows a first 16a, a second 16b and a third cartridge 16c. The cartridges 16 are standard pyrotechnic explosives that produce a high pressure gas 18 when detonated. The cartridges 16 are ignited by detonating means 19 comprising detonator caps 20 that receive an electrical current from a sequencer 21. The caps 20 receive the current sequentially according to a timer within the sequencer 21. The timer directs the current from one cartridge 16 to the other according to a program inputted into the sequencer 21. The cartridges 16 are connected by the manifold means 14, to a pair of telescopic pistons 22, that are used to push the store 4 away from the aircraft. The telescopic pistons 22 can be any standard telescopic pistons used in ejector racks. The telescopic pistons 22 having smaller pistons 22a capable of extending from within protractable larger pistons 22b. It being preferable that the pistons 22 have a spring return to allow easy reloading of the ejector system 2. Nontelescopic pistons can also be used in this system 2.

The system 2 may also have a pair of orifices 24 attached to the manifold means 14, to control the amount of gas 18 that flows to each telescopic piston 22, providing pitch rate control of the store 4. Flow control can be accomplished by the devices disclosed in U.S. Pat. No. 4,043,525 by JAKUBOWSKI, which is hereby incorporated by reference, or by using plugs 26 schematically shown in FIG. 1. The plugs 26 have holes 28 that can restrict the flow of gas to the pistons 22. The plugs 26 are detachable, allowing plugs 26 with varying hole 28 sizes to be placed in the system 2. By allowing gas 18 to flow into one telescopic piston 22 more than the other, the pitch rate of an ejected store 4 can be varied.

Figure 2:
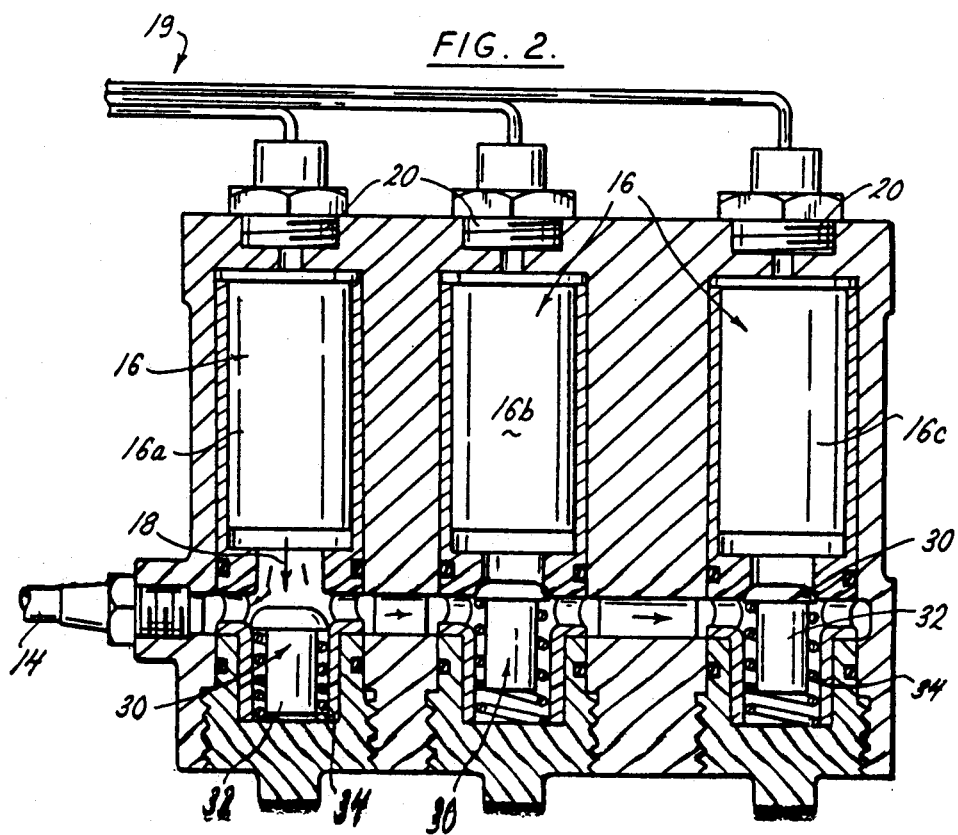
FIG. 2 is a cross-sectional view of three explosive cartridges, one being detonated, used to provide pressurized gas to the over-center latch mechanism and ejector pistons, wherein each cartridge has a check valve that opens when the cartridge is detonated.

As shown in FIG. 2 each cartridge 16 may have a check valve 30 that prevents gaseous communication between each cartridge 16. The check valve 30 comprises a valve piston 32 that is biased by a spring 34 into a closed position. When a cartridge 16 is detonated, the pressure from the exploded gas 18 opens the valve 30 of the detonated cartridge 16, allowing the pressurized gas 18 to enter the latch 12 and telescopic 22 pistons. The other check valves 30 remain closed to prevent the pressurized gas 18 from self-detonating the other cartridges 16. Each check valve 30 opens when its corresponding cartridge 16 is detonated. This allows the cartridges 16 to be detonated sequentially instead of the simultaneous detonation that occurres in standard systems that have no check valves 30.

As another embodiment, the system 2 can be constructed wherein one of the cartridges 16 does not have a check valve 30. This allows for sympathetic firing of the valveless cartridge. For example, if the first cartridge 16a did not have a check valve and did not detonate when fired, the detonation of the second cartridge 16b would also detonate the first cartridge 16a essentially providing a backup detonator for the first cartridge. This configuration would provide greater reliability in insuring that the proper amount of energy is delivered to the ejector pistons.

Figure 4:
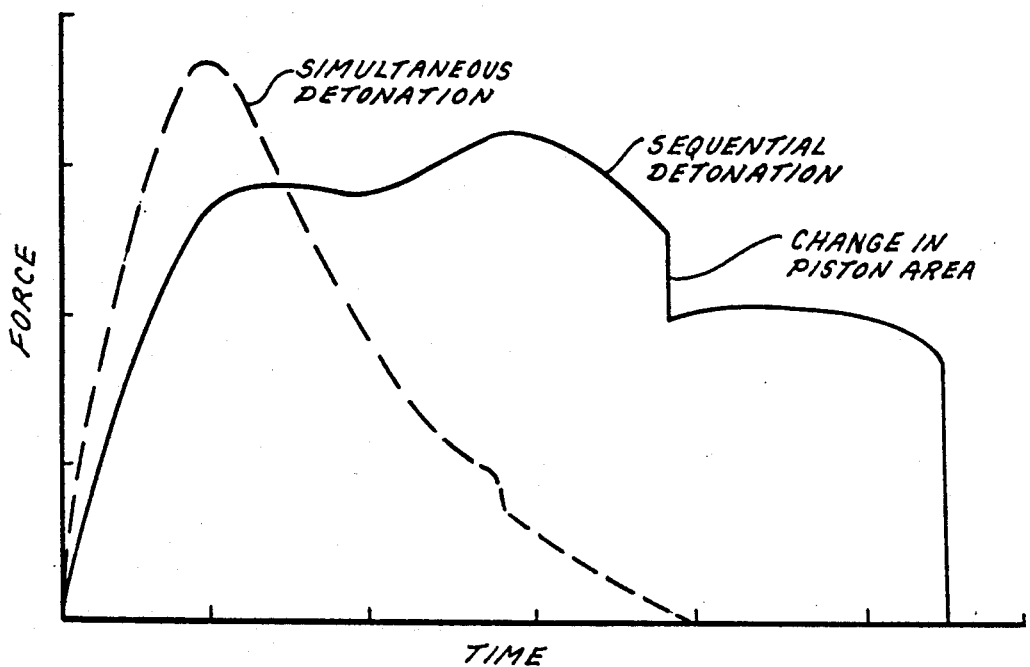
FIG. 4 is a graph showing the shock exerted on a store by the ejector system.
Figure 3:
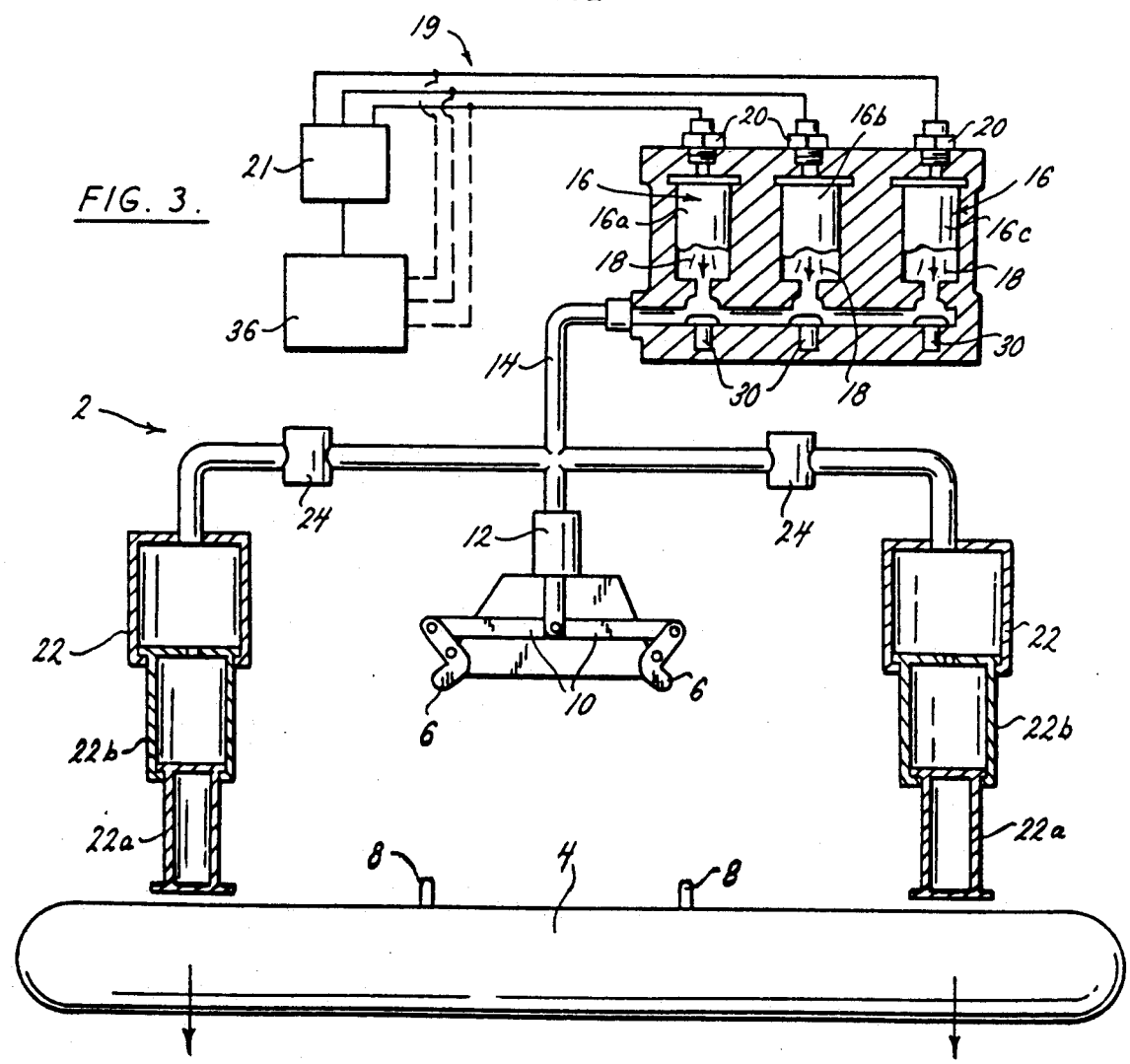
FIG. 3 is a diagrammatical view of an ejector system similar to the ejector system in FIG. 1, showing a store ejected from the ejector system.

The operation of the ejector system 2 is shown in FIGS. 1 and 3. The sequencer 21 provides a current to the detonator cap 20 of the first cartridge 16a. The first cartridge 16a is detonated, opening the check valve 30 and allowing the pressurized gas 18 of the cartridge 16 to enter the manifold means 14. The gas 18 moves the release piston 12, actuating the over-center linkage 10, causing the latches 6 to release from the store 4, see FIG. 3. The gas 18 also flows into the telescopic pistons 22, pushing the larger piston 22b outward from the aircraft. At a predetermined time interval the sequencer 21 ignites the second cartridge 16b, supplying more energy to the telescopic pistons 22 and restabilizing or slightly increasing the piston force. FIG. 4 shows the piston force dramatically decreasing, due to the change of piston area that occurs when the larger piston 22b is fully extended and the smaller piston 22a is still traveling. At about this point the third cartridge 16c is detonated providing additional energy to the system 2. When the smaller telescopic pistons 22a are fully extended the store 4 is fully released from the system 2 as shown in FIG. 3. The exact point in time that the second and third cartridges are to be detonated can vary according to the velocity, shock and force requirements of the store 4. Although this specification depicts three cartridges 16, any system with two or more cartridges 16 can be used.

FIG. 4 shows how the sequential detonation of the cartridges 16 results in a lower and more constant piston force as the store 4 is ejected, as opposed to the shock load that occurs when the cartridges 16 are simultaneously detonated. The lower force and shock loads produced by this system 2 are being capable of effectively ejecting the electronic shock sensitive stores 4 that are carried by aircraft today.

Computer controller means 36 can be added to provide input to the sequencer 21, or it could be directly wired, to provide electrical current to the detonator caps 20. The computer controller 36 could select and change the time intervals between detonation of each cartridge 16. The computer controller 36 could also change the number and sequential order of cartridges 16 to be detonated. This would allow the release velocity to be changed during flight, to compensate for any changes in attack angle, speed etc., that might occur during a mission. The computer controller 36 could store in memory, the number of cartridges detonated and the timing sequence between cartridges 16 for a certain sized store 4 to reach a required velocity. The pilot could then input the desired velocity, or the aircraft computer could determined what velocity is required and provided its own input. Variable orifices receptive to computer controller 36 input could also be installed to allow the computer controller 36 to change the pitch rate of the store 4.

Incorporation of a computer controller 36 would be useful when the ejector system 2 is used on a turret, where stores 4 of varying sizes and different velocity and load requirements are placed on different ejectors 2. The release loads, velocities and shock limits could be easily changed by the computer controller 36, instead of the time consuming method of manually resetting each ejector system 2 as is done on present systems. The computer controller 36 controlled changes in timing sequence etc., could be performed from a remote area such as the cockpit of the aircraft.

While certain exemplary embodiments of this invention have been described above and shown in the accompanying drawings, it is to be understood that such embodiments are merely illustrative of, and not restrictive on, the broad invention. The invention is not to be limited by the specific constructions or arrangements shown and described, since various other modifications may occur to persons having ordinary skill in the art.

What is claimed is:

1. An ejector system that restrains and ejects a store, comprising:
    a) a plurality of explosive cartridges;
    b) detonating means for sequentially detonating a series of said explosive cartridges at predetermined time intervals, said explosive cartridges producing a high pressure gas;
    c) manifold means connected to said explosive cartridges to provide gaseous communication from said explosive cartridges;
    d) latch means for restraining the store, operatively connected to said manifold means to receive said high pressure gas, wherein said high pressure gas operatively causes said latch means to disengage from the store; and
    e) at least one ejector piston, operatively connected to said manifold means to receive said high pressure gas, wherein said high pressure gas extends said at least one ejector piston, whereby when said detonating means sequentially detonates said series of explosive cartridges, the store is released from said latch means and ejected by said at least one ejector piston.

2. The ejector system as recited in claim 1, further comprising a plurality of check valves operatively connected to said explosive cartridges, each one of said explosive cartridges having a single corresponding check valve, said check valves normally in a closed position to prevent gaseous communication between each said explosive cartridge, each said check valve opening when said corresponding explosive cartridge is detonated, allowing gaseous communication between said detonated explosive cartridge and said manifold means, whereby said check valves prevent a detonated explosive cartridge from self-detonating another explosive cartridge.

3. The pyrotechnic source as recited in claim 1, further comprising a plurality of check valves operatively connected to less than all of said plurality of explosive cartridges, each check valve having a corresponding explosive cartridge, said check valves normally in a closed position to prevent gaseous communication between said corresponding explosive cartridge and said manifold means, each said check valve opening when said corresponding explosive cartridge is detonated, allowing gaseous communication between said detonated explosive cartridge and said manifold means, whereby said check valves prevent a detonated explosive cartridge from self-detonating said corresponding explosive cartridges.

4. The pyrotechnic source as recited in claim 1, said detonating means further comprising:
    a plurality of detonator caps; said detonator caps being operatively connected to said explosive cartridges;
    a controller means, said controller means being operatively connected to said detonator caps;
    said controller means sequentially actuating said detonator caps at predetermined time intervals, said detonator caps in turn sequentially detonating said explosive cartridges at said predetermined time intervals.

5. An ejector system that restrains and ejects a store, comprising:
    a) three explosive cartridges;
    b) detonating means for sequentially detonating said explosive cartridges at predetermined time intervals, said detonated explosive cartridges producing a high pressure gas;
    c) manifold means connected to said explosive cartridges to provide gaseous communication from said explosive cartridges;
    d) three check valves, each one of said check valves operatively connected to a corresponding explosive cartridge to prevent gaseous communication between said corresponding explosive cartridge and said manifold means, each said check valve opening when said corresponding explosive cartridge is detonated, allowing gaseous communication between said detonated explosive cartridge and said manifold means;
    e) latch means for restraining the store, operatively connected to said manifold means to receive said high pressure gas, wherein said high pressure gas operatively causes said latch means to disengage from the store; and
    f) two telescopic ejector pistons operatively connected to said manifold means to receive said high pressure gas, wherein said high pressure gas extends said telescopic ejector pistons, whereby when said detonating means sequentially detonates said explosive cartridges, said check valves open allowing said high pressure gas to enter said latch means and said telescopic ejector pistons, releasing the store from said latch means and ejecting the store with said telescopic ejector pistons.

6. The ejector system as recited in claim 5 further comprising, a pair of variable orifices connected to said manifold, each said variable orifice operatively connected to a corresponding telescopic ejector piston, to control the flow of high pressure gas to said corresponding telescopic ejector piston, whereby said variable orifices can allow more high pressure gas to flow to one of said telescopic ejector pistons than the other, producing a change in pitch angle for said store when said store is ejected by said telescopic ejector pistons.

7. The pyrotechnic source as recited in claim 5, said detonating means further comprising:
    a plurality of detonator caps; said detonator caps being operatively connected to said explosive cartridges;
    a controller means, said controller means being operatively connected to said detonator caps;
    said controller means sequentially actuating said detonator caps at predetermined time intervals, said detonator caps in turn sequentially detonating said explosive cartridges at said predetermined time intervals.

* * * * *